(12) United States Patent
Kauffman et al.

(10) Patent No.: US 10,947,406 B2
(45) Date of Patent: Mar. 16, 2021

(54) MATERIALS BASED ON DRYING OILS

(71) Applicants: William J. Kauffman, Manheim, PA (US); Walter J. Lewicki, Jr., Lancaster, PA (US)

(72) Inventors: William J. Kauffman, Manheim, PA (US); Walter J. Lewicki, Jr., Lancaster, PA (US)

( * ) Notice: Subject to any disclaimer, the term of this patent is extended or adjusted under 35 U.S.C. 154(b) by 483 days.

(21) Appl. No.: 15/986,195

(22) Filed: May 22, 2018

(65) Prior Publication Data

US 2018/0355202 A1 Dec. 13, 2018

Related U.S. Application Data

(63) Continuation-in-part of application No. 15/891,803, filed on Feb. 8, 2018.

(60) Provisional application No. 62/603,842, filed on Jun. 13, 2017.

(51) Int. Cl.
| | | |
|---|---|---|
| *C09D 107/00* | (2006.01) | |
| *C09D 123/12* | (2006.01) | |
| *C09D 115/00* | (2006.01) | |
| *C08L 23/10* | (2006.01) | |
| *C09D 123/10* | (2006.01) | |
| *C08K 11/00* | (2006.01) | |

(52) U.S. Cl.
CPC ............ *C09D 107/00* (2013.01); *C08L 23/10* (2013.01); *C09D 115/00* (2013.01); *C09D 123/10* (2013.01); *C09D 123/12* (2013.01); *C08K 11/00* (2013.01)

(58) Field of Classification Search
None
See application file for complete search history.

(56) References Cited

U.S. PATENT DOCUMENTS

| | | | | |
|---|---|---|---|---|
| 2,358,475 | A * | 9/1944 | Pratt | C08G 18/36 106/252 |
| 2,467,912 | A * | 4/1949 | Rust | C08G 63/48 554/26 |
| 3,293,094 | A | 12/1966 | Nairn et al. | |
| 3,365,353 | A | 1/1968 | Witman | |
| 4,154,911 | A | 5/1979 | Bak et al. | |
| 4,631,083 | A | 12/1986 | Christhilf et al. | |
| 5,145,929 | A | 9/1992 | Ou-Yang | |
| 5,604,277 | A | 2/1997 | Osborn | |
| 5,916,956 | A | 6/1999 | Wang et al. | |
| 5,961,903 | A | 10/1999 | Eby et al. | |
| 7,572,858 | B2 * | 8/2009 | Wang | C08J 3/005 525/191 |
| 9,518,198 | B1 * | 12/2016 | Kauffman | C09D 5/00 |
| 2005/0011401 | A1 * | 1/2005 | Bauer | C09K 21/12 106/18.11 |
| 2012/0016038 | A1 * | 1/2012 | Faucher | A61P 31/00 514/784 |

FOREIGN PATENT DOCUMENTS

| | | |
|---|---|---|
| GB | 321690 A | 11/1929 |
| GB | 322266 A | 7/1930 |
| GB | 402759 A | 12/1933 |

\* cited by examiner

*Primary Examiner* — Stefanie J Cohen
(74) *Attorney, Agent, or Firm* — Saxton & Stump, LLC

(57) ABSTRACT

This invention describes the manufacture of partially cured binder compositions based upon modification of drying oils with at least one multi-functional co-vulcanizing agent. The partially cured binder compositions can be blended with polymeric materials to prepare polymer blends. These polymer blends can be used to produce products such as cured solid layers. Methods of manufacturing the partially cured binder compositions and cured solid layers are described.

19 Claims, No Drawings

MATERIALS BASED ON DRYING OILS

CROSS REFERENCE TO RELATED APPLICATIONS

This application is a Continuation-in-Part or and claims priority to U.S. application Ser. No. 15/891,803 filed on Feb. 8, 2018, which claims the benefit of a previously filed U.S. Provisional Application No. 62/603,842 filed on Jun. 13, 2017, both of which are incorporated by reference in their entirety.

FIELD OF THE INVENTION

The invention is directed to partially cured binder compositions comprising a reaction product of at least one drying oil and at least one multi-functional co-vulcanizing agent and their methods of manufacture.

BACKGROUND OF THE INVENTION

Drying oils harden/cure after a period of exposure to air. The oil hardens through a chemical reaction in which the components crosslink by action of oxygen—air oxidation. Drying oils include but are not limited to natural oils such as linseed oil, Tung oil, sunflower oil, walnut oil, poppy oil, perilla oil, and air drying synthetic alkyd resins. These materials are utilized in coatings, paints, printing inks and flooring.

For example, the manufacture of Linoleum flooring involves partially air oxidizing linseed oil until a select viscosity is obtained. This oxidation is done at elevated temperature and takes significant time to reach the desired viscosity. This partially pre-oxidized/partially cured material is called Lynoxyn.

Lynoxyn is then mixed with rosin, fillers and pigments and subsequently consolidated into solid layer, typically on a backing material to form a flooring structure. At this stage, the flooring does not possess the desired physical properties and needs to be further oxidatively cured by "stoving" at slightly elevated temperature in circulating air. This curing process takes considerable time such as 8-16 weeks before desired properties are obtained. Although there have been some improvements in linoleum curing times, there remains a need for more rapid curing of these materials. More rapid curing has advantages in coatings, paints and printing ink applications as well.

SUMMARY OF THE INVENTION

This invention describes the manufacture of partially cured binder compositions based upon modification of drying oils with at least one multi-functional co-vulcanizing agent. In one embodiment, the mixture of at least one drying oil and at least one multi-functional co-vulcanizing agent further comprises at least one radical initiator and oxygen is removed from the composition. The mixture is then reacted by heating at elevated temperature in inert conditions to produce the desired partially cured binder composition. For example, inerting gases commonly used are Carbon Dioxide, Argon, and Nitrogen. Inerting techniques may include purging, blanketing, and sparging depending upon the end result desired.

In another embodiment, the mixture of at least one drying oil and at least one multi-functional co-vulcanizing agent further comprises a siccative material and the mixture is reacted under normal oxidative conditions to a desired viscosity for the partially cured binder composition.

In other embodiments, the partially cured binder compositions of this invention can be used to produce products such as cured solid layers including filled or transparent coatings. One preferred embodiment is the use in flooring products. In another preferred embodiment, a transparent coating for use as a wear layer is described. In a third preferred embodiment, a printing ink is used in typical decorating process is described.

DESCRIPTION OF THE INVENTION

The detailed description set forth below is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

This invention describes the manufacture of partially cured binder compositions based upon modification of drying oils. Drying oils harden after a period of exposure to air. The oil hardens through a chemical reaction in which the components crosslink by action of oxygen—air oxidation. Drying oils include but are not limited to natural oils such as linseed oil, Tung oil, sunflower oil, walnut oil, poppy oil, perilla oil, and drying synthetic alkyd resins. Typically, these drying oils are partially reacted with oxygen until a desired viscosity is achieved for the polymer binder. The binder compositions of this invention comprise the addition of a reactive multi-functional co-vulcanizing agent with the drying oil prior to forming the partially cured polymer binder. A partially cured binder composition is produced that offers material and process advantages.

In one embodiment, at least one multi-functional co-vulcanizing agent can be co-reacted with at least one drying oil under oxidative conditions. Additionally, the multi-functional co-vulcanizing agent can be self-reacted under radical conditions if oxygen is not present. Non-limiting examples of multi-functional co-vulcanizing agents include triallyl cyanurate, triallyl isocyanurate, trimethanolpropane triallyl ether, pentaerythritol tetra allyl ether, or other poly-functional materials that include an activated alpha methylene group adjacent a peroxide curable double or triple bond.

These multi-functional co-vulcanizing agents can be monomeric or polymeric in nature and comprise at least two reactive functional groups.

In general, the co-vulcanizing agent can be added from 1% up to 100% by weight of the drying oil depending upon the co-vulcanizing agent's composition and processing conditions. In various illustrative embodiments the co-vulcanizing agent is at least around 1%, at least around 5%, at least around 10%, at least around 15%, at least around 20%, at least around 25%, at least around 30%, at least around 35%, at least around 40%, at least around 45%, at least around 50%, by weight of the drying oil. One embodiment has the co-vulcanizing agent at a 1%-30% level.

The elements of this invention can be described by the following embodiments. The oxidation of linseed oil to produce Lynoxyn is well known and has been the basis of the manufacture of Linoleum flooring. One issue in the manufacture of linoleum is that once the Lynoxyn binder is compounded into a Linoleum formulation and processed into a flooring structure it requires additional oxidation for considerable time to cure and develop the necessary physical properties required to function as a resilient flooring layer or material. This is usually accomplished by stoving at slightly elevated temperatures with air flowing through the stoving equipment. Historically this could take up to 8 weeks to 16 weeks to reach desired curing.

In this embodiment, at least one reactive multi-functional co-vulcanizing agent is added to at least one drying oil, i.e. linseed oil, and the mixture subjected to normal oxidative conditions until the desired viscosity is achieved producing a partially cured binder. Siccatives and optionally peroxide can be added to the mixture to facilitate the reaction. The reaction may be quenched as done in the normal linoleum process if desired. When linseed oil is utilized, this produces a modified Lynoxyn binder. Significantly shorter reaction time is required to obtain the desired viscosity for the modified Lynoxyn binder. This modified binder composition is then processed into Linoleum and subjected to oxidative stoving conditions. Additional siccative materials can be added to the modified Lynoxyn before oxidative curing. The cure time to achieve desired properties is significantly reduced, such as, but not limited to, 2 weeks or less before the desired properties are obtained. It is understood that some stoving time or annealing time may still be desired to achieve desired properties, for example, improved dimensional stability of the final product, depending upon the formulation composition and process option selected.

In one embodiment, the partially cured binder composition of the invention is combined with at least one polymer material to produce a polymer blend. The partially cured binder produced by the normal oxygen oxidation process can be blended with at least one additional polymer composition to produce a polymer blend. These blends can be a single phase, or multiple phases depending upon the polymer(s) selected. The polymer selected can be either a thermoset or thermoplastic material. In one option, the polymeric material(s) selected can be cured by the same mechanism as the partially cured binder composition. In another embodiment, the polymeric material(s) selected can be cured by a different mechanism than the partially cured binder composition, leading to polymer blend composition having potential for dual cure mechanisms.

In another embodiment, a partially cured binder prepared by normal oxygen oxidation conditions can be mixed with other materials such as natural rubbers, unsaturated polyesters comprising renewable components, or other renewable based polymeric materials. These renewable blended compositions can be further cured by oxidative, radical or other known options to produce cured solid layers. Dual cure compositions are possible.

In one example, a polymer blend having 20% of the partially cured binder prepared by normal oxidative conditions and 80% Natural Rubber (NR) is prepared using an extruder. A peroxide curative for the natural rubber is added and mixed into the polymer blend. The polymer blend is extruded into a nip consisting of two rollers which forms a layer. The layer is heated at elevated temperature to decompose the peroxide and cure the rubber. Subsequently, the cured layer is exposed to oxygen annealing that further cures the partially cured binder of this invention.

In another example, 80% epoxidized natural rubber (ENR), and 20% of the partially cured binder prepared by normal oxidation are compounded on a two roll mill. The epoxy component of the ENR reacts with the partially cured binder enhancing compatibility. A peroxide curative for the ENR is added and mixed into the polymer blend. After forming into a layer and curing at elevated temperature a polymer blend with good physical properties is obtained.

Blends with thermoplastic polymers are also possible. This includes traditional thermoplastic polymer as well as thermoplastic polymers comprising renewable components. In one embodiment the partially cured binder composition is compatible with the thermoplastic polymer. In another embodiment, the partially cured binder composition is incompatible and produces a blend having at least two phases. In one embodiment, the phase of the partially cured binder composition is dispersed within the continuous phase of the thermoplastic polymer(s). The partially cured binder composition can be cured to produce a polymer blend comprising at least one phase having a cured polymeric binder of the invention.

In one example, 20% of the partially cured binder composition produced by normal oxidation conditions is compounded with 80% polypropylene using extruder conditions of about 175 C. The polymer blend is extruded onto a double belted press, consolidated and cooled to form a layer. The layer has a phase of the partially cured binder composition dispersed within a phase of polypropylene. The partially cured binder continues to cure by oxygen oxidation.

In another embodiment, a peroxide is added to a mixture of at least one multi-functional co-vulcanizing agent and at least one drying oil, and oxygen is removed. Typically, nitrogen is employed to maintain an inert environment. The mixture is stirred and heated to decompose the peroxide to cause the co-vulcanizing agent and drying oil to react increasing viscosity to produce a partially cured polymer binder composition. Siccatives can then be added to the binder composition to allow oxidative curing if desired. This partially cured polymer binder can be compounded with fillers, fibers, pigments and other polymeric materials to produce compositions that can be formed into layers which can be oxidatively cured resulting in solid layers. It is also possible to utilize polymeric materials to produce polymer blends that can be cured by alternate methods, leading to polymer blend compositions having potential for dual cure mechanisms. It is also possible to produce polymer blend compositions utilizing thermoplastic polymeric materials blended with the partially cured binder composition.

In another embodiment, the partially cured binder composition obtained by decomposing a peroxide under inert conditions is further compounded with another peroxide, formed into a layer, and subsequently fully cured by heating to decompose the peroxide under inert conditions. It is understood that other materials such as fillers and fibers can be added. Natural fiber and in particular nano-cellulose are added to provide increased strength and flexibility to the layer. The final mixture is deaerated to remove oxygen. One process option would be to use an extruder with deaeration and form a solid layer which is further cured in the presence of nitrogen. Additionally, the subsequent use of non-porous double belt presses to heat and cool one or more layers during curing is more efficient in retaining an oxygen free environment. Less nitrogen inerting gas is required in this method.

In another embodiment, a partially cured binder prepared by decomposing a peroxide under inert conditions can be mixed with other materials such as natural rubbers, unsaturated polyesters from natural produced components, or other natural based materials. These blended compositions can be formed into layers and cured by radical or other known options to produce solid layers. Dual cure compositions are also possible. Blends with thermoplastic polymers are also possible.

The solid layers comprising the partially cured binder can be produced by traditional means. A continuous extruder process is advantageous for those compositions described that use peroxide curing under inert conditions. Additionally, other materials such as particles or particles of the same material but having different color can be applied and processed into the solid layer to provide other visual effects. One or more double belted presses in combination with particle scattering machines are used to form patterned linoleum flooring, desktop material, wall coverings and like products. Examples of belt surfaces include but are not limited to Teflon, silicone, stainless steel, polypropylene paper, and the like. In addition, engraved or etched steel plates and belts produce unique multilevel texturing on the surfaces of the cured layer. Similarly, an extended press nip having engraved components produces three dimensionalities to one or both sides of the binder layer which enhances design appeal and increases wear surface performance.

In yet another example, a double belted press or plates having engraved or etched designs is applied to a design on the partially cured binder layer. The design can be printed by rotogravure, screen, lithographic, and digital printing systems. Also, a design can be applied by many other decorating methods which are well known to those skilled in the art. The preferred printing technique is digital printing and more specifically ink jet printing. In the manufacturing process, the engraved design of the belt or plate is mechanically embossed into a design on the binder layer. If desired, matching the size of the embossed design to the print (MEIR) is achieved by making adjustments at the digital printer or by making temperature adjustments to equipment and/or material during manufacture. Natural materials contain grain, fissures, particles and the like. Excellent replications of real wood, minerals, sandstone, limestone, granite, marble, and ceramic mosaic designs having textured surfaces are produced in this manner.

Typically, the layer is formed on a backing material. In one embodiment, the layer can be cured by heating under inert conditions to initiate radical cross-linking. The temperature selected is dependent upon the initiator used, and the desired kinetics of radical generation. More than one radical generator can be utilized in the formulation. It is understood that the layer can be formed onto known substrates: such as woven and non-woven backings containing natural and synthetic materials, felt or glass backings, stainless steel, Teflon or silicone belts, and/or release paper. In another example, embossed release paper, design carrying belts or engraved plates can be used to impart 3-D dimensionality to one or both sides of the layer. It is also understood that other well-known options for heating and curing the layer may be used, such as the use of double stainless steel and Teflon-coated double belt presses.

In yet another embodiment, inert curing conditions are not required. For example, applying an impermeable layer, to the surface of the layer, inhibits oxygen from penetrating into the layer during the curing process. The impermeable layer may be a transparent wear layer, a decorative layer, and/or a combination of a wear layer and decorative layer. The layer is applied by lamination, coating prior to curing, or a combination of lamination and/or coating prior to final cure. The methods used by those skilled in the art to make a surface of a substrate impervious to oxygen and or moisture are well known.

In another embodiment, the layer comprising the partially cured binder can also contain a blowing agent which expands the layer when heated. The partially cured binder layer, can be printed with one or more of the design inks containing a foam inhibitor. A "chemically embossed in register" structure (CEIR) is produced after application of the wear layer and application of a higher temperature, during which the blowing agent is activated to form a foam. At the same time, the areas of ink containing an inhibitor retards the expansion of the blowing agent: Ref: U.S. Pat. Nos. 3,293,094 and 3,365,353. In addition, applying an overall mechanical embossing texture onto the raised non-retarded surfaces of a (CEIR) structure as in Ref: U.S. Pat. No. 5,961,903 realistic replications of natural materials and tiles are produced.

In another embodiment, the partially cured binder composition of this invention can be used to produce surface coverings that have three dimensionality (embossing) on one or both sides of the cured layer comprising the binder composition. The embossing can be a random texture or in register with a printed design.

In another embodiment, the partially cured binder composition can be formulated into non-traditional formulations to produce new materials for use as a flooring layer or other applications. For example, the partially cured binder composition without opaque fillers can be processed into a transparent/translucent coating or ink, and subsequently cured using oxidative or radical techniques, including radiation. Radiation techniques include, but are not limited to, e-beam and UV curing; forms of electromagnetic radiation that enhance cure of polymeric compositions. In another example, the binder composition can incorporate aluminum oxide, ceramic, or other hard particles to improve wear surface performance.

In another embodiment, a UV initiator is added to the transparent coating composition and the applied coating is subsequently UV cured. In one embodiment, the transparent, cured coating functions as a wear layer for a resilient material.

In another embodiment, the binder with or without fine abrasion resistant particles can be used as an ink or coating for non-resilient surfaces such as wood, tile, painted metal and the like.

In yet another embodiment, colorants can be added to the partially cured binder composition and be used for decorative purposes. In one embodiment, the colorant/binder composition functions as an ink in printing. The decorative ink can be cured using oxidative or radical techniques, including radiation.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments

The invention claimed is:

1. A polymer blend composed of at least polymeric material and at least one partially cured binder composition comprising a reaction product of at least one drying oil and at least one multi-functional co-vulcanizing agent.

2. The polymer blend of claim 1, wherein the reaction product is formed using oxygen oxidation conditions.

3. The polymer blend of claim 2, wherein the partially cured binder composition comprises a siccative material.

4. The polymer blend of claim 1, wherein the reaction product is formed by using at least one radical initiator.

5. The polymer blend of claim 4, wherein the reaction product is formed under inerting conditions, without the presence of oxygen.

6. The polymer blend of claim 1, wherein the at least one polymeric material is a thermoset material.

7. The polymer blend of claim 6, wherein the polymeric material comprises renewable components.

8. The polymer blend of claim 6, wherein the thermoset polymeric material and partially cured binder are compatible and comprise a single phase.

9. The polymer blend of claim 6, wherein the thermoset polymeric material and the partially cured binder are incompatible and comprise at least two phases.

10. The polymer blend of claim 6, wherein the thermoset polymeric material and the partially cured binder are cured by the same mechanism.

11. The polymer blend of claim 6, wherein the thermoset polymeric material and the partially cured binder are cured by different mechanisms.

12. The polymer blend of claim 1, wherein the at least one polymeric material is a thermoplastic material.

13. The polymer blend of claim 12, wherein the polymeric material comprises renewable components.

14. The polymer blend of claim 12, wherein the thermoplastic polymeric material and partially cured binder are compatible and comprise a single phase.

15. The polymer blend of claim 12, wherein the thermoplastic polymeric material and the partially cured binder are incompatible and comprise at least two phases.

16. The polymer blend of claim 15, wherein at least one phase comprising partially cured binder composition is cured.

17. A layer comprising the polymer blend of claim 1.

18. A layer comprising the polymer blend of claim 6.

19. A layer comprising the polymer blend of claim 12.

* * * * *